(12) United States Patent
Chandra

(10) Patent No.: US 6,565,891 B1
(45) Date of Patent: May 20, 2003

(54) NUTRITIONAL SUPPLEMENT FOR CHILDREN

(75) Inventor: Ranjit Kumar Chandra, Harvana (IN)

(73) Assignee: Tsar Health Private Ltd. (IN)

( * ) Notice: Subject to any disclaimer, the term of this patent is extended or adjusted under 35 U.S.C. 154(b) by 0 days.

(21) Appl. No.: 10/226,195

(22) Filed: Aug. 23, 2002

(51) Int. Cl.[7] .................. A61K 31/315; A61K 31/355; A61K 31/375; A61K 31/4188; A61K 31/4415; A61K 31/51; A61K 31/714; A61K 33/00; A61K 33/04; A61K 33/06; A61K 33/16; A61K 33/18; A61K 33/24; A61K 33/26; A61K 33/30; A61K 33/32; A61K 31/07; A61K 31/095; A61K 31/28; A61K 31/295; A61K 31/30

(52) U.S. Cl. .................. 424/601; 426/73; 426/74; 426/800; 514/52; 514/75; 514/167; 514/168; 514/184; 514/249; 514/251; 514/276; 514/345; 514/356; 514/387; 514/458; 514/474; 514/492; 514/494; 514/499; 514/500; 514/502; 514/505; 514/563; 514/725; 514/763; 514/885; 514/904; 514/905; 424/600; 424/602; 424/603; 424/604; 424/605; 424/606; 424/630; 424/631; 424/632; 424/633; 424/634; 424/635; 424/637; 424/638; 424/639; 424/640; 424/641; 424/643; 424/646; 424/647; 424/648; 424/655; 424/656; 424/667; 424/668; 424/669; 424/670; 424/671; 424/672; 424/673; 424/674; 424/675; 424/676; 424/678; 424/681; 424/682; 424/683; 424/686; 424/687; 424/688; 424/689; 424/692; 424/693; 424/694; 424/695; 424/696; 424/697; 424/702; 424/722

(58) Field of Search .................. 424/600–606, 424/630–635, 637–641, 643, 646–648, 655–656, 667–676, 678, 681–683, 686–689, 692–697, 702, 722; 514/52, 75, 167, 168, 184, 249, 251, 276, 345, 356, 387, 458, 474, 492, 494, 499, 500, 502, 505, 563, 725, 763, 885, 904, 905; 426/73, 74, 800

(56) References Cited

U.S. PATENT DOCUMENTS

| | | | |
|---|---|---|---|
| 4,070,488 A | 1/1978 | Davis ..................... | 426/72 |
| 4,237,118 A | 12/1980 | Howard ..................... | 424/630 |
| 4,994,283 A | 2/1991 | Mehansho et al. ............. | 426/74 |
| 5,556,644 A | 9/1996 | Chandra ..................... | 424/630 |
| 5,561,160 A * | 10/1996 | Walaszek et al. ............ | 514/574 |
| 5,571,441 A * | 11/1996 | Andon et al. .................. | 252/1 |
| 5,719,133 A | 2/1998 | Schmidl et al. ................ | 514/58 |
| 5,719,134 A | 2/1998 | Schmidl et al. ................ | 514/58 |
| 5,770,215 A * | 6/1998 | Moshyedi ..................... | 424/440 |
| 5,780,039 A * | 7/1998 | Greenberg et al. ............. | 424/400 |
| 5,869,084 A | 2/1999 | Paradissis et al. ............ | 424/439 |
| 5,922,704 A | 7/1999 | Bland ......................... | 514/185 |
| 5,925,377 A | 7/1999 | Gerth et al. ................. | 424/451 |
| 6,245,360 B1 | 6/2001 | Markowitz ................... | 424/641 |
| 6,299,896 B1 | 10/2001 | Cooper et al. ............... | 424/441 |
| 6,361,800 B1 | 3/2002 | Cooper et al. ............... | 424/630 |
| 6,451,341 B1 * | 9/2002 | Slaga et al. ................. | 424/468 |
| 2002/0015761 A1 * | 2/2002 | Prosise et al. ............... | 426/72 |
| 2002/0102330 A1 * | 8/2002 | Schramm et al. ............. | 426/72 |

FOREIGN PATENT DOCUMENTS

| | | | |
|---|---|---|---|
| WO | 99/58000 | * | 11/1999 |
| WO | 01/68534 | * | 9/2001 |

OTHER PUBLICATIONS

Torkos, S. Choosing a vitamin and Mineral Supplement for Your Child [retrieved on Dec. 27, 2002]. Retrieved from the Internet: <URL: www.thrillworks.com/health notes/Supp/Multi vitamin.htm.*

Centrum Junior product information [retrieved on Dec. 27, 2002]. Retrieved from the Internet: <URL: http://www.centrum.co.uk/content–28.*

Sesame Street Complete Product Information [retrieved on Dec. 27, 2002]. Retrieved from the Internet: <URL: http://www.rxsolutions.com.*

Flinstones Complete Product Information [retrieved on Dec. 27, 2002]. Retrieved from the Internet: <URL: http://www.bayercare.com.*

Bugs Bunny Tablets Plus Iron product Information [retrieved on Dec. 27, 2002]. Retrieved from the Internet: <URL: http://www.otcservice.com/productpages/BugsBunnyVitamins.*

CNN.com—Cite: Health/Diet/Fitness: Article entitled "New guidelines released on vitamin, mineral supplements" 2 pages; Jan. 9, 2001.

Alternate Health.com—Article entitled "Vitamin/Mineral Supplements" 3 pages; Aug. 12, 2002.

* cited by examiner

*Primary Examiner*—John Pak
(74) *Attorney, Agent, or Firm*—Liniak, Berenato & White

(57) ABSTRACT

A multinutrient nutritional supplement is provided that is designed to be most effective in optimizing health, increasing the immunity and decreasing the instances and severity of infection particularly among children.

5 Claims, 2 Drawing Sheets

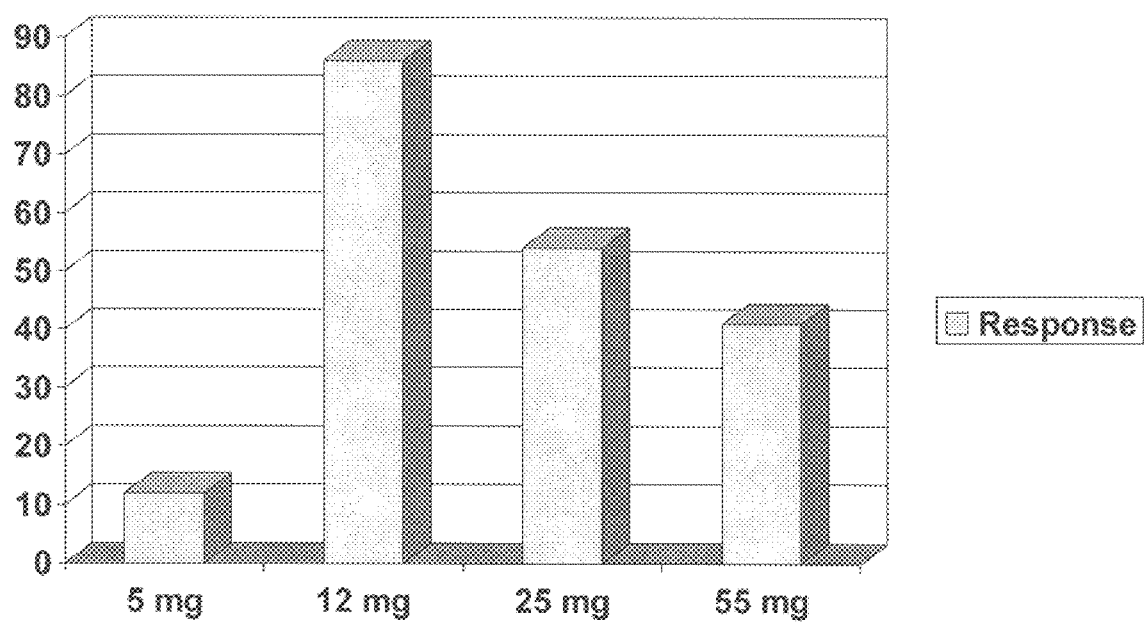
Fig. 1. Lymphocyte stimulation response to PHA related to total zinc intake.

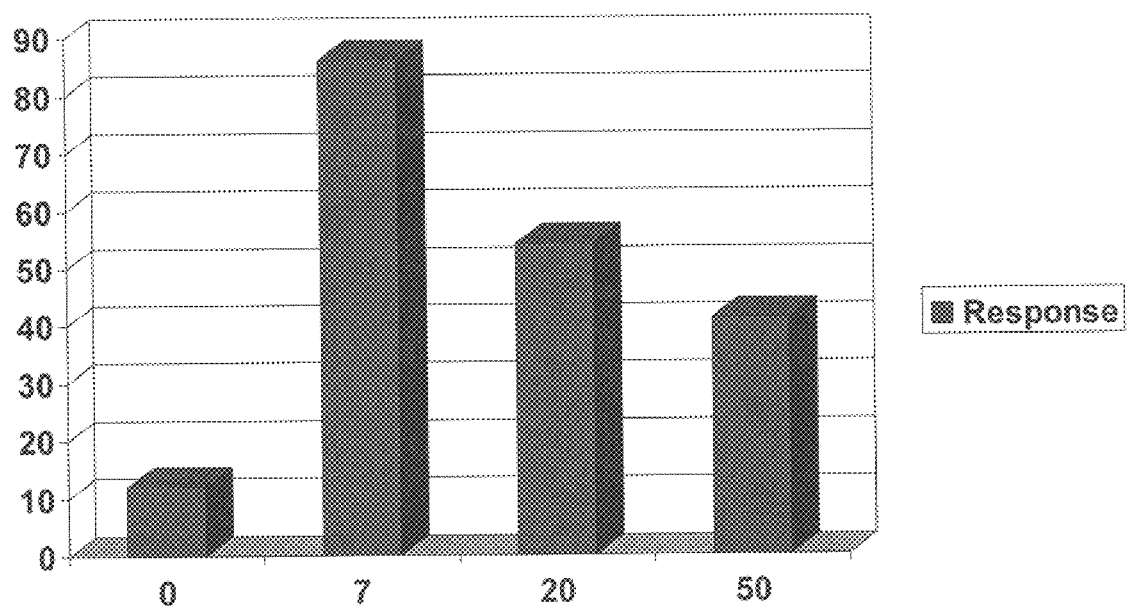
Fig. 2. Lymphocyte response to PHA related to amount of zinc in the supplement.

NUTRITIONAL SUPPLEMENT FOR CHILDREN

FIELD OF THE INVENTION

The present invention relates to nutritional supplements, and more particularly relates to nutritional supplements optimized for administration to children. The invention further relates to nutritional supplements optimized for enhanced immunological response in children.

BACKGROUND OF THE INVENTION

In the U.S., Canada, Western Europe, Japan, and other industrialized affluent countries, our exposure to "malnutrition" comes from the print and audiovisual media, and visual images in newspapers, magazines, and television. These highlight the problem of nutritional deficiencies that are widely observed in less developed countries and in underprivileged populations in general. In addition to protein-energy malnutrition, deficiencies of individual nutrients are widespread throughout the world. In particular, deficiencies of iron, vitamin A and iodine are endemic in some regions in all continents. It has been estimated that at least 600 million individuals suffer from such deficiencies.

It is surprising that nutrient deficiencies may also be seen in particular age groups in the U.S., Canada, and other affluent countries. Iron deficiency was very common in infants and young children but the advent of iron-fortified infant formulas and of cereals has reduced its incidence dramatically. However, these problems have not disappeared.

Factors other poverty can lead to nutrient deficiencies in children age 4–12 years. During the rapid growth phase, the needs for nutrient deficiencies are enhanced. Secondly, many children are fussy eaters and in spite of the best efforts of their parents, they do not consume an adequate amount and variety of foods.

Furthermore, it has been demonstrated recently that additional amounts of some nutrients may reduce the severity of some illnesses and reduce the number of complications.

It is now recognized that certain age groups and some physiological states require additional amounts of nutrients. A case in point is pregnancy. Pregnant women are recognized to need a greater amount of various nutrients not only to maintain their own good health but also ensure an adequate growth and satisfactory state of the unborn baby. These needs have been addressed, for example, in U.S. Pat. No. 4,994,283 directed to nutritional mineral supplements which include iron and calcium compounds in combination with citrates or tartrates, ascorbates, and fructose in an effort to reduce the tendency of calcium to inhibit the bioavailability of iron, so that the conjoint bioavailability of these two minerals is enhanced.

Another group with special nutrient needs is the elderly. Their numbers are increasing and their health needs are much greater than those of younger individuals because they are ill more often and each episode of illness, such as pneumonia or fracture, requires a longer time to recover from. It has been estimated that at least one-third of the elderly in the US and Canada and Europe have objective evidence of nutritional deficiencies. The prior art described in U.S. Pat. No. 5,556,644 addressed these concerns and special needs, and is hereby incorporated by reference.

The special nutrient needs of children are recognized. This is consequent on their rapid growth and increased needs of vitamins and minerals for various physiological systems. U.S. Pat. Nos. 5,719,133 and 5,719,134 have addressed this to some extent but these are food compositions for children with various diseases where the protein, amino acid, mineral, fat, and carbohydrate needs are very different from those of normal children. Such compositions are not for oral administration and are not directed to optimizing the health of normal children and children in need of nutritional supplementation to enhance immune responses and to prevent the problem of general malnutrition and specifically to prevent vitamin, mineral and trace element deficiencies.

SUMMARY OF THE INVENTION

The present invention overcomes the shortcomings of preparations that contain single nutrients or a combination of a limited number of nutrients. This invention is specifically tailored for administration to children age 4 to 12 years to meet their special needs, and provides a method for maintaining the optimal health and immunological function of children by administration of the same. The formulation of the invention has been found to benefits of vitamin and mineral supplementation for children and at the same time minimizing undesirable side effects that accrue from the administration of single nutrients and large doses of nutrients.

The composition of the invention is uniquely optimized to sustain physical and mental health of children age 4 to 12 years, and in particular to maximize their immunological function.

Thus, the invention provides a multivitamin, mineral and trace element supplement for administration to children age 4 to 12 years, which comprises calcium in the amount of about 255 to about 345 mg; chromium in the amount of about 17 to about 23 µg; copper in the amount of about 263.5 to about 356.5 µg; fluoride in the amount of about 0.935 to about 1.265 mg; iodine in the amount of about 76.5 to about 103.5 µg; iron in the amount of about 12.75 to about 17.25 mg; magnesium in the amount of about 25.5 to about 34.5 mg; manganese in the amount of about 1.275 to about 1.725 mg; molybdenum in the amount of about 229.5 to about 310.5 µg; phosphorus in the amount of about 255 to about 345 mg; selenium in the amount of about 85 to about 115 µg; zinc in the amount of about 5.95 to about 8.05 mg; beta-carotene in the amount of about 0.765 to about 1.035 mg; vitamin A in the amount of about 467.5 to about 632.5 µg; vitamin C in the amount of about 34 to about 46 mg; vitamin D in the amount of about 6.8 to about 9.2 µg; vitamin E in the amount of about 13.6 to about 18.4 mg; thiamin in the amount of about 1.36 to about 1.84 mg; riboflavin in the amount of about 0.935 to about 1.265 mg; niacin in the amount of about 10.2 to about 13.8 mg; vitamin $B_6$ in the amount of about 1.445 to about 1.955 mg; folic acid in the amount of about 204 to about 276 µg; vitamin $B_{12}$ in the amount of about 2.38 to about 3.22 µg; pantothenic acid in the amount of about 1.105 to about 1.495 mg; and biotin in the amount of about 18.7 to about 25.3 µg.

An advantage of the present invention is that the nutritional supplement of the present invention supplies the right amount of the necessary nutrients including vitamins and minerals to children to assure optimal intake of nutrients needed for health and maximal immunological response and protection against nutritional losses and deficiencies due to lifestyle factors and inadequate dietary patterns.

Another advantage of the present invention is that the nutritional supplement of the present invention provides the necessary vitamins and minerals to allow children using the supplement to maintain their present health and positively influence their future health.

Another advantage of the present invention is that the nutritional supplement of the present invention increases and/or optimizes the immunological responses of children that are users of the supplement, such immunological responses including lymphocyte response to PHA, interleukin-2, antibody response and thymulin activity.

Still another advantage of the present invention is that the nutritional supplement of the present invention reduces the occurrence of common infections in the children that are using the supplement.

These and other advantages and benefits of the present invention will be apparent to those skilled in the art upon reading and understanding the following detailed description of the invention.

BRIEF DESCRIPTION OF THE DRAWINGS

FIG. 1 is a dose response curve for the total amount of zinc taken by 4 to 12 year old children; and FIG. 2 is the dose response curve for zinc as administered to 4 to 12 year old children with the amounts of zinc given as a supplement shown.

DETAILED DESCRIPTION OF THE PREFERRED EMBODIMENTS

The present invention is directed to a nutritional supplement containing the appropriate amounts of vitamins and trace elements that sustains an optimum level of immunity and reduces the incidence of infections among 4 to 12 year old boys and girls. As noted above, none of the nutrient preparations in the market have documented benefits shown by this invention.

The present invention is directed to a nutritional supplement for administration to children to enhance and improve their immunological response which comprises calcium in the amount of about 255 to about 345 mg; chromium in the amount of about 17 to about 23 μg; copper in the amount of about 263.5 to about 356.5 μg; fluoride in the amount of about 0.935 to about 1.265 mg; iodine in the amount of about 76.5 to about 103.5 μg; iron in the amount of about 12.75 to about 17.25 mg; magnesium in the amount of about 25.5 to about 34.5 mg; manganese in the amount of about 1.275 to about 1.725 mg; molybdenum in the amount of about 229.5 to about 310.5 μg; phosphorus in the amount of about 255 to about 345 mg; selenium in the amount of about 85 to about 115 μg; zinc in the amount of about 5.95 to about 8.05 mg; beta-carotene in the amount of about 0.765 to about 1.035 mg; vitamin A in the amount of about 467.5 to about 632.5 μg; vitamin C in the amount of about 34 to about 46 mg; vitamin D in the amount of about 6.8 to about 9.2 μg; vitamin E in the amount of about 13.6 to about 18.4 mg; thiamin in the amount of about 1.36 to about 1.84 mg; riboflavin in the amount of about 0.935 to about 1.265 mg; niacin in the amount of about 10.2 to about 13.8 mg; vitamin $B_6$ in the amount of about 1.445 to about 1.955 mg; folic acid in the amount of about 204 to about 276 μg; vitamin $B_{12}$ in the amount of about 2.38 to about 3.22 μg; pantothenic acid in the amount of about 1.105 to about 1.495 mg; and biotin in the amount of about 18.7 to about 25.3 μg.

The children's nutritional supplement of the present invention is more particularly directed to a supplement comprising calcium in the amount of about 300 mg; chromium in the amount of about 20 μg; copper in the amount of about 310 μg; fluoride in the amount of about 1.1 mg; iodine in the amount of about 90 μg; iron in the amount of about 15 mg; magnesium in the amount of about 30 mg; manganese in the amount of about 1.5 mg; molybdenum in the amount of about 270 μg; phosphorus in the amount of about 300 mg; selenium in the amount of about 100 μg; zinc in the amount of about 7 mg; beta-carotene in the amount of about 0.9 mg; vitamin A in the amount of about 550 μg; vitamin C in the amount of about 40 mg; vitamin D in the amount of about 8 μg; vitamin E in the amount of about 16 mg; thiamin in the amount of about 1.6 mg; riboflavin in the amount of about 1.1 mg; niacin in the amount of about 12 mg; vitamin $B_6$ in the amount of about 1.7 mg; folic acid in the amount of about 240 μg; vitamin $B_{12}$ in the amount of about 2.8 μg; pantothenic acid in the amount of about 1.3 mg; and biotin in the amount of about 22 μg.

Each of the component vitamins and minerals making up the nutritional supplement of the present invention are preferably provided in bioavailable forms. This means that absorption and utilization are enhanced. As a result, more of the nutrients provided will actually be available to the adolescent user, rather than simply passing through the digestive track unused by the body. However, other forms of the components may be used if the amounts of each component are adjusted to give similar bioavailable quantities.

Calcium

Calcium is the most common mineral in the human body and is vitally important because adequate intakes are an important determinant of bone health and risk of fracture or osteoporosis. Calcium has four major biological functions: 1) structural as stores in the skeleton, 2) electrophysiological—carries charge during an action potential across membranes, 3) intracellular regulator, and 4) as a cofactor for extracellular enzymes and regulatory proteins. Although acute deficiency symptoms are avoided because of the large skeletal stores, prolonged bone resorption from chronic dietary deficiency can lead later in life to osteoporosis due to inadequate accumulation of bone mass during growth in dolescence. Dietary calcium deficiency also has been associated with increased risk of hypertension, preeclampsia, and colon cancer. Increasing calcium intakes during adolescence increases calcium accretion up to 1300 mg/day and increases bone mineral content. Even in children, bone density determines fracture risk.

Chromium

Chromium is an essential nutrient required for normal sugar and fat metabolism and functions primarily by potentiating the action of insulin. Signs of deficiency include impaired glucose tolerance and elevated circulating insulin. In some studies, chromium supplementation has reduced total serum cholesterol, triglycerides and apolipoprotein B and increased HDL-cholesterol.

Copper

Copper is an essential trace element involved in the absorption, storage and metabolism of iron. Copper deficiency is often observed in those suffering from malnutrition and can result in anemia, cardiac abnormalities such as blood vessel and heart rupture, abnormal EKG's and elevated levels of serum cholesterol, triglycerides and glucose. A lifetime of marginal diet copper is thought to lead to heart disease.

Copper helps keep blood vessels elastic, is needed for the formation of elastin and collagen, functions as an iron oxidizer, and is needed for the proper functioning of vitamin C. In a preferred embodiment of the invention, copper is dosed in a pharmaceutically acceptable copper compound including, but not limited to, cupric oxide, cupric sulfate, cupric gluconate, and combinations thereof.

Fluoride
Fluoride's best known effect is to serve as a catalyst for both the mineralization of developing tooth enamel prior to tooth eruption and for remineralization of surface enamel, thus greatly reducing occurrence of dental decay. Fluoride may also assist in stimulating new bone growth. Most foods are very low in fluoride and thus the major source of fluoride is fluoridated drinking water.

Iodine
Iodine forms an essential component of the thyroid hormones which regulate cell activity and growth in virtually all tissues and are, therefore, essential for both normal growth and development. Iodine deficiency impairs growth and neurological development, which can damage the brain and can lead to a wide spectrum of health problems, ranging from mild intellectual impairment to severe mental retardation, growth stunting, apathy, and impaired movement, speech or hearing. Cretinism is a rare disorder in which many of these abnormalities occur, represents the extreme of early iodine deficiency. Much more widespread is an intellectual blunting that may afflict as many as 50 million of the estimated 1.6 billion "at-risk" people living in iodine deficient regions, making iodine deficiency the most common preventable cause of mental retardation in the world. Because of decreased production of thyroid hormones, iodine deficiency causes compensatory hypertrophy of the thyroid gland as it attempts to make more thyroid hormone, resulting in a goiter—a disfiguring condition that is common in high-risk areas. Collectively, health problems arising from a lack of iodine are known as iodine deficiency disorders (IDD).

Iron
Iron is an essential nutrient that carries oxygen and forms part of the oxygen-carrying proteins, hemoglobin in red blood cells and myoglobin in muscle. It is also a necessary component of various enzymes. Iron deficiencies result in anemia.

Any pharmaceutically acceptable iron compound can be used in the nutritional supplement of the present invention and may be chosen from any of the well-known iron II (ferrous) or iron III (ferric) supplements, such as ferrous sulfate, ferric chloride, ferrous gluconate, ferrous lactate, ferrous tartrate, iron-sugar-carboxylate complexes, ferrous fumarate, ferrous succinate, ferrous glutamate, ferrous citrate, ferrous pyrophosphate, ferrous cholinisocitrate, ferrous carbonate, and the like.

In a further embodiment of the present invention, the iron compound comprises a pharmaceutically acceptable ferrous sulfate compound coated with a pharmaceutically acceptable film forming material which permits release of the ferrous sulfate in the intestine of the adolescent administered the supplement. Suitable coatings include any material known in the art for forming enteric, controlled release, or sustained release coatings, such as cellulose ethers including hydroxypropyl methylcellulose, methylcellulose, ethylcellulose, and carboxymethylcellulose; cellulose esters such as cellulose acetate, cellulose acetate phthalate, and cellulose nitrate; acrylate and methacrylate copolymers; and the like. The coated iron compound has been found to provide increased iron bioavailability by minimizing interaction between the iron compound and divalent cations such as calcium in the nutritional supplement. In addition, the coated iron compound is better tolerated and causes few stomach problems.

Magnesium
Magnesium plays a central role in the secretion and action of insulin and in glucose metabolism. The mineral helps control blood sugar and is able to prevent many diabetic complications. Magnesium has an essential role in the proper functioning of the entire cardiovascular system. Magnesium deficiency can be a predisposition to many conditions such as heart disease, kidney stones, cancer, and insomnia. Deficiency is common enough in the United States that scientists have recommended fortifying drinking water with magnesium to the Federal Drug Administration. Any pharmaceutically acceptable magnesium compound can be used.

Manganese
Manganese is important to maintain the integrity of the skin, bone and menstrual cycle, and in cholesterol metabolism. Any pharmaceutically acceptable manganese compound can be used.

Molybdenum
Molybdenum is an essential nutrient that is a component of a number of enzymes involved in the metabolic process.

Phosphorus
Phosphorus is an essential mineral that is found in all cells within the body. The metabolism of all major metabolic substrates depends on the functioning of phosphorus as a cofactor in a variety of enzymes and as the principal reservoir for metabolic energy.

Selenium
Selenium is an essential trace element that functions as a component of enzymes involved in antioxidant protection and thyroid hormone metabolism. Characteristic signs of selenium deficiency have not been described in humans, but very low selenium status is factor in the etiologies of a juvenile cardiomyopathy (Keshan Disease) and a hondrodystrophy (Kashin-Beck Disease) that occur in selenium-deficient regions of China.

Zinc
Zinc is required for proper formation of DNA and RNA and is needed for growth and sexual development of young women and men, including children and adolescents. Deficiency signs include skin rashes, poor discolored hair, diarrhea, respiratory infections, and poor taste.

Beta-carotene
Beta-carotene is a precursor to vitamin A and is associated with decreased risk of some degenerative diseases, and there is some evidence also for its role in improving immune function. Deficiencies may be associated with detrimental but non-life-threatening skin changes (including acne and dermatitis).

Vitamin A
Vitamin A is a fat-soluble vitamin. The best-known function of vitamin A is in vision, where it participates in the visual cycle. Night blindness is one of the early signs of vitamin A deficiency, because of the role of vitamin A in vision. Bacterial invasion and permanent scarring of the cornea of the eye (xerophthalmia) is a symptom of more profound deficiency. Profound vitamin A deficiency also results in altered appearance and function of skin, lung, and intestinal tissues. Children are most at risk of vitamin A deficiency because they have not yet developed adequate vitamin A stores. It has been estimated that 5 million children in the world become blind each year, 70% of these due to vitamin A deficiency. Over half of these blind children die from malnutrition and associated illnesses.

Vitamin C
Vitamin C, also known as ascorbic acid, is necessary for the synthesis of collagen and is used as an antioxidant. Vitamin C fights infection, reduces inflammation, heals wounds, reduces the risk of heart disease, lowers cholesterol, reduces the risk of lung, stomach, and esophageal cancers, reduces cervical epithelial abnormalities, inhibits N-nitrosamine, and reduces the severity of colds.

Vitamin D

Vitamin D assists in the mineralization and calcification of bone, prevents rickets in children, prevents osteomalacia in adults, preserves bone and tooth growth, and lowers blood pressure. Vitamin D is fat-soluble.

Vitamin E

Vitamin E is also fat-soluble and is needed for the maintenance of cell membranes and for neurological health. Vitamin E is the generic term for a group of related substances which include alpha-tocopherol, beta-tocopherol, gamma-tocopherol, and delta-tocopherol. In addition, each of these four compounds has a "d" form, which is the natural form, and a "dl" form which is the synthetic form.

Thiamin

Thiamin (vitamin B-1) is a water-soluble substance, consisting of thiazole and pyrimidine rings joined by a methylene bridge and has a biologic half-life in the body of about 15 days. Thus thiamin-deficient diets will rapidly show effects of thiamin deficiencies. Deficiency signs include neuralgias and swellings of the face and legs.

Riboflavin

Riboflavin participates in oxidation-reduction reactions in numerous metabolic pathways and in energy production via the respiratory chain. Riboflavin is used therapeutically to ameliorate ariboflavinosis resulting from diverse causes such as inadequate dietary intake, decreased assimilation, rare genetic defects in the formation of specific flavoproteins, hormonal disorders and after use of certain drugs. Deficiency signs include rough skin, angular stomatitis, cracked lips, and mouth ulcers.

Niacin

Niacin (nicotinic acid or nicotinamide) is essential in the form of the coenzymes NAD and NADP in which the nicotinamide moiety acts as electron acceptor or hydrogen donor in many biological redox reactions.

Pellagra, the classic niacin deficiency disease, is characterized by symmetrical dermatitis, diarrhea, and dementia. Often associated with a largely cereal diet such as maize or sorghum, the disease is now rarely seen in industrialized countries but still appears in India, China, and Africa. Pellagra often is associated with other micronutrient deficiencies and may develop also in cases of disturbed tryptophan metabolism (carcinoid syndrome, Hartnup's).

Vitamin B6

Vitamin B6 or pyridoxine is involved in the production of ribonucleic acid (RNA) and deoxyribonucleic acid (DNA) and many other reactions in the body. Pyridoxine refers to and includes three different compounds: pyridoxine, pyridoxamine, and pyridoxal. hydrochloride. Deficiency or dependency has been associated with diarrhea, rough skin, anemia and convulsions.

Folate

Folate is an essential vitamin that plays a role in the synthesis of RNA, DNA and protein, and thus the folate requirement and, consequently, the risk of deficiency is elevated during periods of rapid growth such as in adolescence. Low folate intakes also are correlated with high levels of serum homocysteine which are associated with an increased risk of atherosclerosis and several forms of vascular disease. Folate is present in many foods, however, the folate content of foods is inherently variable and a large fraction of the folate consumed each day comes from foods that are frequently ingested, but not particularly concentrated, sources of the vitamin. Flour sold in some countries such as USA and Canada is fortified with folic acid.

Vitamin B12

Vitamin B12 or the cobalamins is necessary for overall metabolism, the function of the nervous system, metabolism of folic acid, and the production of red blood cells. There are at least three active forms of cobalamin: cyanocobalamin, hydroxocobalamin, and nitrocobalamin. In a preferred embodiment of the present invention, vitamin B12 is provided in the form of cyanocobalamin. Deficiency or dependency has been associated with diarrhea, rough skin, anemia and convulsions.

Pantothenic acid

Pantothenic acid is important for the production of adrenal gland hormones, increases overall energy, and helps convert food into energy.

Biotin

Biotin, also known as vitamin H and coenzyme R (Hexahydro-2-oxo-1H-thienal[3,4-d]-imidazole-4-pentatonic acid), functions as an essential cofactor for four carboxylases that catalyze the incorporation of cellular bicarbonate into the carbon backbone of organic compounds. Severe deficiencies of biotin can cause thinning of hair, loss of hair color, and eventually complete loss of hair; a scaly, red rash distributed around the openings of the eyes, nose, mouth, and perineal area; and central nervous system abnormalities such as depression, lethargy, hallucinations, and paresthesias.

Administration

The nutritional supplements of the invention may be provided in any suitable dosage form known in the art. For example, the compositions may be incorporated into tablets, powders, granules, beads, chewable lozenges, capsules, aqueous suspensions or solutions, other liquid forms, or similar conventional dosage forms, using conventional equipment and techniques known in the art. Liquid or suspension form is preferred for young children, and tablet form for older children. When preparing dosage forms incorporating the compositions of the invention, the nutritional components are normally blended with conventional excipients such as binders, including gelatin, pregelatinized starch, and the like; lubricants, such as hydrogenated vegetable oil, stearic acid, and the like; diluents, such as lactose, mannose, and sucrose; disintegrants, such as carboxymethyl cellulose and sodium starch glycolate; suspending agents, such as povidone, polyvinyl alcohol and the like; absorbents, such as silicon dioxide; preservatives, such as methylparaben, propylparaben, and sodium benzoate; surfactants, such as sodium lauryl sulfate, polysorbate 80, and the like; and colorants, such as F.D. & C dyes and the like. Tablets may contain carriers such as lactose and corn starch, and/or lubricating agents such as magnesium stearate. Capsules may contain diluents including lactose and dried corn starch. Aqueous suspensions may contain emulsifying and suspending agents combined with the active ingredient. The oral dosage forms may further contain sweetening and/or flavoring and/or coloring agents.

All of the aforementioned benefits are achieved without wasting vitamin and mineral materials, as characteristic of unitary supplements of the prior art and without the detriment of an excess of some or all of the vitamin and mineral materials. This makes the products of the invention not only more cost effective than conventional supplements, but also, and more significantly, without the detriment of an over dose of any vitamin or mineral materials.

Although the products of the invention are preferably intended for administration to humans, it will be understood that the formulations may also be utilized in veterinary therapies for other animals.

The following example is given to illustrate the invention but is not deemed to be limiting thereof. All amounts specified in the application are based on milligrams unless otherwise indicated.

EXAMPLES

Example 1

Dose Response Curves

The basic concept underlying the assessment of the most optimum nutrient amounts for a given age group uses the principle of "dose-response curves". At least four groups of individuals were provided with various amounts of a given nutrient and their immune responses were measured using established and accepted techniques. The amount of a nutrient that gave the best response was considered the optimum amount. Dose response curves were determined for all vitamins and trace elements considered essential for human health, particularly immunity.

Data for the dose response curve for zinc in a group of 4 to 12 year old children is shown in FIGS. 1 and 2, with the total amount of zinc taken is shown for each group. To determine the magnitude of immune response, an aliquot of blood was withdrawn from each subject in the study, blood lymphocytes were separated, washed and mixed with the mitogen phytohemagglutinin (PHA) in previously determined optimum amount. The optimum amount of PHA used in the experiments was predetermined by a set of dose response curves using lymphocytes of a healthy donor and four different concentrations of PHA. After culture in a sterile environment for 72 hours, the cells were washed and mixed with radioactive thymidine. The same steps were undertaken in a control sample in which only the culture medium was used, not PHA. The cells were washed and radioactivity determined.

The ratio of radioactivity in the test samples divided by radioactivity in control samples gave the "stimulation response" shown in FIGS. 1 and 2. Table 1 shows the dose response curve for several immune responses related to dose of zinc in addition to the amount in diet and the maximum response was seen in those receiving a total of 12 mg of zinc.

TABLE 1

Effect of various amounts of zinc on immune responses in children age 4–12 years.

| | Amount of supplemental zinc (mg) | | | |
|---|---|---|---|---|
| | 0 | 7 | 20 | 50 |
| Lymphocyte response to PHA (stimulation index) | 12(6)** | 86(11) | 54(9) | 41(8) |
| Interleukin-2 (units/ml) | 2.8(1.1)** | 16(2.0) | 11(1.5) | 8(1.3) |
| Antibody response (median reciprocal titre) | 36** | 318 | 129 | 73 |
| Thymulin activity (median reciprocal titre) | 4* | 216 | 187 | 166 |

* Significantly different from the three groups receiving zinc supplement.
**Values for the group 7 mg of zinc supplement are different statistically from values for each of the other three groups.

Values are Shown as Median (Standard Deviation)
For each of the four groups, the average amount of zinc in the diet was 5 mg.

It was concluded from this study that 12 mg of zinc intake produced the best immune response. Dietary intake of zinc was calculated based on three 24-hour recalls and by the food frequency questionnaire methods. The mean of these observations was 5 mg per individual per day. Thus, for the best physiological immune response, an additional 7 mg of zinc would be needed.

Similar experiments were conducted and dose-response curves calculated for each of the other nutrients listed below in Table 2. The optimum amount of each nutrient to maximize immunological response in 4 to 12 year old children were found to be those mounts set forth in Table 2, with the preferred ranges set forth in Table 3.

Example 2

Randomized Controlled Trial

The most widely accepted ideal method of showing the positive or negative benefits of a treatment modality is the randomized controlled trial (RCT). It can be further refined and made more objective by using the principles of double-blinded observations and placebo-controlled. This implies that a group of study subjects are recruited for the trial. Based on computer-generated random numbers, each individual is assigned to one of the two study groups: "Experimental" who receives the study product, "placebo" who receives the inert or dummy product.

The subjects are observed both clinically and their blood samples are tested periodically. Infection is diagnosed on clinical grounds as also by appropriate laboratory tests on blood, urine, sputum, and by radiographs of the chest, sinuses or other regions, as deemed appropriate for the individual at that time.

The "Experimental" group received the study product, which was made up by mixing together the nutrients in amounts shown in Table 2. The results of the randomized prospective double-blind placebo-controlled trial conducted over a period of 12 months were used to draw conclusions.

From these experiments, it was determined that the supplemental amounts of various vitamins and trace elements, other than what was present in the average diet, that gave the maximum immune response in a group of 4 to 12 year old children was as set forth in Table 2.

TABLE 2

Optimized supplement formulation for children

| | |
|---|---|
| Calcium | 300 mg |
| Chromium | 20 ug |
| Copper | 310 ug |
| Fluoride | 1.1 mg |
| Iodine | 90 ug |
| Iron | 15 mg |
| Magnesium | 30 mg |
| Manganese | 1.5 mg |
| Molybdenum | 270 ug |
| Phosphorus | 300 mg |
| Selenium | 100 ug |
| Zinc | 7 mg |
| Beta-carotene | 0.9 mg |
| Vitamin A | 550 ug |
| Vitamin C | 40 mg |
| Vitamin D | 8 ug |
| Vitamin E | 16 mg |
| Thiamin | 1.6 mg |
| Riboflavin | 1.1 mg |
| Niacin | 12 mg |
| Vitamin B6 | 1.7 mg |
| Folic acid | 240 ug |
| Vitamin B12 | 2.8 ug |

TABLE 2-continued

Optimized supplement formulation for children

| | |
|---|---|
| Pantothenic acid | 1.3 mg |
| Biotin | 22 µg |

The amounts of nutrients expected to give physiologically similar results are recognized to be + or −15% of the specified value. Thus, the preferred range of nutrient amounts that would give the response as noted in Table 2 is set forth in Table 3 below.

TABLE 3

Preferred range of values for inventive supplement

| | |
|---|---|
| Calcium | 255–345 mg |
| Chromium | 17–23 µg |
| Copper | 263.5–356.5 µg |
| Fluoride 1.1 mg | 0.935–1.265 mg |
| Iodine | 76.5–103.5 µg |
| Iron | 12.75–17.25 mg |
| Magnesium | 25.5–34.5 mg |
| Manganese | 1.275–1.725 mg |
| Molybdenum | 229.5–310.5 µg |
| Phosphorus | 255–345 mg |
| Selenium | 85–115 µg |
| Zinc | 5.95–8.05 mg |
| Beta-carotene | 0.765–1.035 mg |
| Vitamin A | 467.5–632.5 µg |
| Vitamin C | 34–46 mg |
| Vitamin D | 6.8–9.2 µg |
| Vitamin E | 13.6–18.4 mg |
| Thiamin | 1.36–1.84 mg |
| Riboflavin | 0.935–1.265 mg |
| Niacin | 10.2–13.8 mg |
| Vitamin B6 | 1.445–1.955 mg |
| Folic acid | 204–276 µg |
| Vitamin B12 | 2.38–3.22 µg |
| Pantothenic acid | 1.105–1.495 mg |
| Biotin | 18.7–25.3 µg |

Example 3

Immune Responses and Infection-related Morbidity

A study was also conducted to compare the immune responses of the control group and for the group receiving the various levels of supplementation. Immune responses were comparable in the two groups at base line. However, the children given the multinutrient showed a much higher response in all the parameters tested (Table 5) including the number of T lymphocytes, CD4+ helper T cells, lymphocyte response to mitogen PHA, interleukin-2 production by mitogen-stimulated lymphocytes, antibody production after booster injection of tetanus toxoid, and natural killer cell activity.

Infection rate was determined meticulously and showed a significant reduction in the group receiving the multinutrient as shown in Table 4 below.

TABLE 4

Randomized controlled trial of the nutritional supplement for children. Immune responses were measured at the end of one year and the incidence of infection observed for the 12-month duration of the study.

| | Supplement | Placebo | p |
|---|---|---|---|
| T lymphocytes (%) | 73(4) | 60(4) | <0.01 |
| CD4+ T cells (%) | 57(3) | 43(4) | <0.001 |
| Lymphocyte stimulation Response | 89(9) | 37(6) | <0.001 |
| Interleukin-2 (U/ml) | 14(2) | 9(2) | <0.01 |
| Antibody response To tetanus toxoid (mean Titre) | 1024 | 483 | <0.05 |
| Natural killer activity(%) | 43(2) | 36(3) | <0.05 |
| Infection (days/yr) | 14(3) | 31(4) | <0.001 |

The two groups did not differ on any of the parameters at base-line.

The data presented in this document show that the administration daily of a multinutrient designed to meet the unique requirements of children enhances immune responses and reduces infection in this age group.

The invention being thus described, it will be obvious that the same may be varied in many ways. Such variations are not to be regarded as a departure from the spirit and scope of the invention and all such modifications are intended to be included within the scope of the following claims.

I claim:

1. A nutritional supplement for children for improving the immunological status of children, said nutritional supplement comprising:

Calcium in the amount of about 255 to about 345 mg;
Chromium in the amount of about 17 to about 23 µg;
Copper in the amount of about 263.5 to about 356.5 µg;
Fluoride in the amount of about 0.935 to about 1.265 mg;
Iodine in the amount of about 76.5 to about 103.5 µg;
Iron in the amount of about 12.75 to about 17.25 mg;
Magnesium in the amount of about 25.5 to about 34.5 mg;
Manganese in the amount of about 1.275 to about 1.725 mg;
Molybdenum in the amount of about 229.5 to about 310.5 µg;
Phosphorus in the amount of about 255 to about 345 mg;
Selenium in the amount of about 85 to about 115 µg;
Zinc in the amount of about 5.95 to about 8.05 mg;
Beta-carotene in the amount of about 0.765 to about 1.035 mg;
Vitamin A in the amount of about 467.5 to about 632.5 µg;
Vitamin C in the amount of about 34 to about 46 mg;
Vitamin D in the amount of about 6.8 to about 9.2 µg;
Vitamin E in the amount of about 13.6 to about 18.4 mg;
Thiamin in the amount of about 1.36 to about 1.84 mg;
Riboflavin in the amount of about 0.935 to about 1.265 mg;
Niacin in the amount of about 10.2 to about 13.8 mg;
Vitamin $B_6$ in the amount of about 1.445 to about 1.955 mg;
Folic acid in the amount of about 204 to about 276 µg;
Vitamin $B_{12}$ in the amount of about 2.38 to about 3.22 µg;
Pantothenic acid in the amount of about 1.105 to about 1.495 mg; and Biotin in the amount of about 18.7 to about 25.3 µg.

2. The nutritional supplement of claim 1 wherein said supplement comprises:
  Calcium in the amount of about 300 mg;
  Chromium in the amount of about 20 µg;
  Copper in the amount of about 310 µg;
  Fluoride in the amount of about 1.1 mg;
  Iodine in the amount of about 90 µg;
  Iron in the amount of about 15 mg;
  Magnesium in the amount of about 30 mg;
  Manganese in the amount of about 1.5 mg;
  Molybdenum in the amount of about 270 µg;
  Phosphorus in the amount of about 300 mg;
  Selenium in the amount of about 100 µg;
  Zinc in the amount of about 7 mg;
  Beta-carotene in the amount of about 0.9 mg;
  Vitamin A in the amount of about 550 µg;
  Vitamin C in the amount of about 40 mg;
  Vitamin D in the amount of about 8 µg;
  Vitamin E in the amount of about 16 mg;
  Thiamin in the amount of about 1.6 mg;
  Riboflavin in the amount of about 1.1 mg;
  Niacin in the amount of about 12 mg;
  Vitamin B6 in the amount of about 1.7 mg;
  Folic acid in the amount of about 240 µg;
  Vitamin B12 in the amount of about 2.8 µg;
  Pantothenic acid in the amount of about 1.3 mg; and
  Biotin in the amount of about 22 µg.

3. A method for maintaining optimal health of a child in need thereof, comprising administering the supplement of claim 1.

4. A method for improving the immunological status of children, said method comprising administering a nutritional supplement comprising:
  Calcium in the amount of about 255 to about 345 mg;
  Chromium in the amount of about 17 to about 23 µg;
  Copper in the amount of about 263.5 to about 356.5 µg;
  Fluoride in the amount of about 0.935 to about 1.265 mg;
  Iodine in the amount of about 76.5 to about 103.5 µg;
  Iron in the amount of about 12.75 to about 17.25 mg;
  Magnesium in the amount of about 25.5 to about 34.5 mg;
  Manganese in the amount of about 1.275 to about 1.725 mg;
  Molybdenum in the amount of about 229.5 to about 310.5 µg;
  Phosphorus in the amount of about 255 to about 345 mg;
  Selenium in the amount of about 85 to about 115 µg;
  Zinc in the amount of about 5.95 to about 8.05 mg;
  Beta-carotene in the amount of about 0.765 to about 1.035 mg;
  Vitamin A in the amount of about 467.5 to about 632.5 µg;
  Vitamin C in the amount of about 34 to about 46 mg;
  Vitamin D in the amount of about 6.8 to about 9.2 µg;
  Vitamin E in the amount of about 13.6 to about 18.4 mg;
  Thiamin in the amount of about 1.36 to about 1.84 mg;
  Riboflavin in the amount of about 0.935 to about 1.265 mg;
  Niacin in the amount of about 10.2 to about 13.8 mg;
  Vitamin $B_6$ in the amount of about 1.445 to about 1.955 mg;
  Folic acid in the amount of about 204 to about 276 µg;
  Vitamin $B_{12}$ in the amount of about 2.38 to about 3.22 µg;
  Pantothenic acid in the amount of about 1.105 to about 1.495 mg; and
  Biotin in the amount of about 18.7 to about 25.3 µg.

5. The method of claim 4, wherein said supplement comprises:
  Calcium in the amount of about 300 mg;
  Chromium in the amount of about 20 µg;
  Copper in the amount of about 310 µg;
  Fluoride in the amount of about 1.1 mg;
  Iodine in the amount of about 90 µg;
  Iron in the amount of about 15 mg;
  Magnesium in the amount of about 30 mg;
  Manganese in the amount of about 1.5 mg;
  Molybdenum in the amount of about 270 µg;
  Phosphorus in the amount of about 300 mg;
  Selenium in the amount of about 100 µg;
  Zinc in the amount of about 7 mg;
  Beta-carotene in the amount of about 0.9 mg;
  Vitamin A in the amount of about 550 µg;
  Vitamin C in the amount of about 40 mg;
  Vitamin D in the amount of about 8 µg;
  Vitamin E in the amount of about 16 mg;
  Thiamin in the amount of about 1.6 mg;
  Riboflavin in the amount of about 1.1 mg;
  Niacin in the amount of about 12 mg;
  Vitamin B6 in the amount of about 1.7 mg;
  Folic acid in the amount of about 240 µg;
  Vitamin B12 in the amount of about 2.8 µg;
  Pantothenic acid in the amount of about 1.3 mg; and
  Biotin in the amount of about 22 µg.

* * * * *